US011150091B2

(12) United States Patent
Malvern (10) Patent No.: US 11,150,091 B2
(45) Date of Patent: Oct. 19, 2021

(54) ANGULAR VELOCITY SENSORS (71) Applicant: ATLANTIC INERTIAL SYSTEMS LIMITED, Plymouth (GB)

(72) Inventor: Alan Malvern, Plymouth (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 550 days.

(21) Appl. No.: 15/758,948

(22) PCT Filed: Aug. 11, 2016

(86) PCT No.: PCT/GB2016/052497
§ 371 (c)(1),
(2) Date: Mar. 9, 2018

(87) PCT Pub. No.: WO2017/025752
PCT Pub. Date: Feb. 16, 2017

(65) Prior Publication Data
US 2018/0231382 A1 Aug. 16, 2018

(30) Foreign Application Priority Data
Aug. 11, 2015 (GB) ...................................... 1514114

(51) Int. Cl.
*G01C 19/5684* (2012.01)
(52) U.S. Cl.
CPC ................................ *G01C 19/5684* (2013.01)
(58) Field of Classification Search
CPC .................................................. G01C 19/5684
(Continued)

(56) References Cited

U.S. PATENT DOCUMENTS 5,450,751 A 9/1995 Putty et al.
5,547,093 A 8/1996 Sparks
(Continued)

FOREIGN PATENT DOCUMENTS

EP 2414775 A1 2/2012
WO 2010114775 A1 10/2010

OTHER PUBLICATIONS

Intellectual Property Office Search Report for International Application No. GB1514114.6 dated Jan. 15, 2016, 3 pages.
(Continued)

*Primary Examiner* — Walter L Lindsay, Jr.
*Assistant Examiner* — Philipmarcus T Fadul
(74) *Attorney, Agent, or Firm* — Cantor Colburn LLP (57) ABSTRACT

An angular velocity sensor comprises: an insulative support layer (10); a substrate layer (8) formed of a silica-based material and comprising a planar ring structure (2) mounted to vibrate in-plane; and a plurality of conductive electrodes (14), each comprising a first set of moveable conductive electrode tracks (14*a*) formed on a surface of the planar ring and a second set of fixed conductive electrode tracks (14*b*) formed on a surface of the insulative support layer axially spaced from the surface of the planar ring. The first and second sets of conductive electrode tracks are interdigitated with a lateral spacing between them in a radial direction. Each moveable conductive electrode track has a radial offset from a median line between adjacent fixed conductive electrode tracks such that each moveable conductive electrode track has a different lateral spacing from two different adjacent fixed conductive electrode tracks in opposite radial directions.

15 Claims, 7 Drawing Sheets

(58) Field of Classification Search
USPC .................................................. 73/504.12
See application file for complete search history.

(56) References Cited

U.S. PATENT DOCUMENTS

| | | | | |
|---|---|---|---|---|
| 5,872,313 A | * | 2/1999 | Zarabadi | G01C 19/5684 73/497 |
| 5,889,207 A | | 3/1999 | Lutz | |
| 7,051,590 B1 | * | 5/2006 | Lemkin | G01C 19/5719 73/504.04 |
| 7,267,005 B1 | | 9/2007 | Kranz et al. | |
| 7,434,465 B1 | | 10/2008 | Stewart | |
| 7,637,156 B2 | | 12/2009 | Araki et al. | |
| 7,908,922 B2 | | 3/2011 | Zarabadi et al. | |
| 8,347,718 B2 | * | 1/2013 | Malvern | G01C 19/5677 73/504.12 |
| 8,375,791 B2 | | 2/2013 | Huang | |
| 8,919,199 B2 | | 12/2014 | Judy et al. | |
| 2005/0172714 A1 | | 8/2005 | Challoner et al. | |
| 2007/0220972 A1 | | 9/2007 | Araki et al. | |
| 2010/0058861 A1 | * | 3/2010 | Kuang | G01C 19/56 73/504.12 |
| 2010/0251818 A1 | * | 10/2010 | Ge | G01C 19/5684 73/504.12 |
| 2013/0105921 A1 | | 5/2013 | Najafi et al. | |
| 2013/0118280 A1 | * | 5/2013 | Mao | G01C 19/5712 74/5.7 |
| 2014/0230547 A1 | | 8/2014 | El-Gamal et al. | |
| 2015/0040663 A1 | | 2/2015 | Fell et al. | |
| 2016/0245653 A1 | * | 8/2016 | Park | G01C 19/5684 |

OTHER PUBLICATIONS

Internation Search Report and Written Opinion for Application No. PCT/GB2016/052497, dated Jan. 20, 2017, 18 pages.

* cited by examiner

ANGULAR VELOCITY SENSORS

CROSS REFERENCE TO RELATED APPLICATIONS

This is a US National Stage of Application No. PCT/GB2016/052497, filed on Aug. 11, 2016, which claims the benefit of GB Application No. 1514114.6 filed Aug. 11, 2015, the disclosures of which are incorporated herein by reference.

TECHNICAL FIELD

The present disclosure relates to angular velocity sensors, in particular Coriolis-type angular velocity sensors comprising a vibrating ring structure formed from a silica-based material rather than silicon.

BACKGROUND

For many modern applications, Coriolis-type angular velocity sensors (also known as gyroscopes) are constructed using Micro-Electro-Mechanical Systems (MEMS) techniques from a silicon wafer sandwiched between glass substrate layers. A planar ring structure is formed in the silicon layer and supported on the lower glass substrate by compliant legs. The silicon ring structure is driven into a cos 2θ mode of vibration at resonance by primary drive transducers that excite the primary vibration mode (in-plane). When the sensor undergoes rotation about an axis perpendicular to the plane of the ring structure, Coriolis forces are generated which couple energy into the secondary vibration mode (in-plane). Such Coriolis-induced motion of the silicon ring is capacitively sensed using secondary pick-off transducers. The ring structure and drive/pick-off transducers are in the same plane, manufactured by etching of the silicon layer. By exploiting two degenerate resonance modes with identical frequencies, the silicon ring has higher rotation sensitivity compared to moving mass architectures that use a single resonance mode for a vibrator that can be displaced out of plane. U.S. Pat. No. 7,637,156 provides an example of such an angular velocity sensor.

MEMS fabrication processes are capable of producing planar silicon ring structures to a high degree of accuracy. However, even minor imperfections in the geometry of the ring structure will result in a frequency split between the primary and secondary modes. It is known to compensate for such a frequency mismatch during operation by using additional transducers formed in the semiconductor substrate to apply a direct voltage offset signal generating an electrostatic force allowing the stiffness of the silicon ring to be locally adjusted until the vibration mode frequencies are matched. This is known as electrostatic balancing (ESB).

Although silicon ring gyroscopes can achieve a relatively high quality factor (Q) >10,000, this is limited by thermoelastic damping (TED), which is principally set by the thermal expansion rate of the semiconductor material (about 3 ppm/° C.). Typical devices may have Q values up to 100,000. Bias errors scale with f/Q, where f is the oscillation frequency, so increasing the quality factor further would decrease the bias error. However, increasing Q also requires there to be very exact frequency matching between the primary and secondary modes e.g. to within 0.0001 Hz. This can be difficult to achieve due to imperfections in the silicon ring e.g. arising from manufacture and variations resulting from changes in temperature.

It would be desirable to increase the quality factor for a Coriolis-type angular velocity sensor. The present disclosure seeks to provide an improvement over the devices outlined above.

SUMMARY

According to the present disclosure there is provided an angular velocity sensor comprising:
an insulative support layer; a substrate layer formed of a silica-based material and comprising a planar ring structure mounted to vibrate in-plane; and
a plurality of conductive electrodes, each electrode comprising a first set of moveable conductive electrode tracks formed on a surface of the planar ring structure and a second set of fixed conductive electrode tracks formed on a surface of the insulative support layer that is facing the surface of the planar ring structure and axially spaced therefrom by a gap in an axial direction normal to the planar ring structure,
wherein the first and second sets of conductive electrode tracks are interdigitated with a lateral spacing between each moveable conductive electrode track and an adjacent fixed conductive electrode track in a radial direction of the planar ring structure, and
wherein each of the moveable conductive electrode tracks has a radial offset from a median line between adjacent fixed conductive electrode tracks such that each moveable conductive electrode track has a first lateral spacing from an adjacent fixed conductive electrode track in a first radial direction and a second, different lateral spacing from an adjacent fixed conductive electrode track in a second opposite radial direction.

Thus according to the present disclosure there is provided an angular velocity sensor comprising a vibrating ring structure formed of a silica-based material rather than silicon. It will be recognised that silica has a thermal expansion rate of only 0.5 ppm/° C., resulting in thermoelastic damping (TED) that is 36 times lower than for silicon and potentially achieving a quality factor that is 36 times greater than conventional devices, resulting in 36 times smaller bias errors. However, silica has not previously been employed instead of silicon in a planar ring MEMS angular velocity sensor because it is an insulator whereas silicon is a semiconductor and normally doped to give a high conductivity. This means that it becomes necessary to create conductive electrodes on the silica ring structure, e.g. so as to be able to apply voltage signals that cause the ring structure to vibrate and to sense changes in vibration due to an angular velocity. This is not a straightforward problem to solve.

While it is known that atomic layer deposition (ALD) enables a conductive metal layer to be coated onto a substrate layer, this techniques applies a conformal film covering all exposed surfaces, resulting in electrical continuity across all elements. Such a conformal film needs to be broken to form a plurality of electrodes that are conductive but electrically isolated from each other. The present disclosure overcomes such issues by forming each of the conductive electrodes from interdigitated first and second sets of conductive electrode tracks that are vertically offset (in the axial direction normal to the planar ring structure), one set being provided on a surface of the planar ring structure (i.e. moveable electrode tracks) and the other set being provided on a facing surface of the insulative support layer (i.e. fixed electrode tracks). The conductive electrode tracks may be applied, for example, as metal tracks on the facing surfaces. Instead of using ALD, a metal coating may be formed by electroplating, sputter deposition, or any other means of thin film deposition (e.g. electron beam assisted deposition, RF deposition or thermal evaporation) with subsequent photolithography to define the metal electrode tracks.

Furthermore, it will be appreciated that application of a voltage to the interdigitated tracks of each electrode will give rise to a net radial electrostatic force that can be used to drive and sense in-plane vibrations of the planar ring structure. This is because each of the moveable conductive electrode tracks (on the silica-based ring structure) has a non-zero radial offset from a median line between adjacent fixed conductive electrode tracks (on the facing surface of the insulative support layer), i.e. the lateral spacing on one side of any given track is wider than the lateral spacing on the other side. Thus when a voltage is applied between these two separate, first and second, sets of electrode tracks there is a net radial force. On the other hand, there is a constant lateral spacing between the conductive electrode tracks in the first set, and between the conductive electrode tracks in the second set.

As will be described further below, one or more of the plurality of conductive electrodes may be used to apply or sense radial electrostatic forces, for example in a capacitive arrangement. This enables differential capacitance sensing and drive. At least some of the plurality of electrodes may also be used to achieve electrostatic balancing. By axially offsetting the second set of fixed conductive electrode tracks from the first set of moveable conductive electrode tracks mounted on the surface of the planar ring, the gap can be selected independently of the depth of the silica substrate layer. This is important because silica-based materials can not be etched to form deep trenches in the same way as silicon with a high aspect ratio of depth to trench width. For a silicon substrate layer, electrodes are normally formed in the semiconductor material by deep reactive ion etching (DRIE) as an aspect ratio of 20:1 can be obtained, e.g. for a 100 µm thick silicon substrate there can be formed conductive electrode tracks having a width and lateral spacing down to 5 µm. While DRIE can be used to etch silica-based materials, a high aspect ratio can not be achieved and is typically only 1:1. If a 100 µm thick silica substrate were to be etched into tracks and coated in a conductive (e.g. metal) layer there could only be formed conductive electrode tracks having a width and lateral spacing of 100 µm, resulting in electric fields that are too low for electrostatic effects. On the other hand, the interdigitated electrode tracks according to the present disclosure are spaced by a gap in the axial direction that is determined by the separation between the surface of the silica substrate layer and facing surface of the insulative support layer.

According to a preferred set of examples, the first and second sets of conductive electrode tracks are axially spaced by a gap that is less than 50 µm, preferably less than 40 µm, further preferably less than 30 µm, and most preferably about 20 microns. The use of interdigitation between conductive electrode tracks that are axially spaced therefore results in a much higher electric field for the same voltage as compared to a lateral spacing of fingers if they were to be etched into the silica substrate layer and subsequently coated with a conductive material. As well as giving as large an electric field as possible for drive and pick off, such an axial gap also allows a maximum trim range for electrodes that are used for electrostatic balancing (discussed further below) to reduce the initial frequency difference between the vibration modes (4$f$) to zero.

Furthermore, in examples according to the present disclosure, the first and second sets of conductive electrode tracks may be interdigitated with a lateral spacing that is relatively small, even compared to interdigitated electrode fingers etched into a silicon substrate layer. The lateral spacing between the interdigitated moveable and fixed electrode tracks may be no more than 15 µm. Preferably either the first or second lateral spacing is no more than 10 µm. The lateral spacing between the interdigitated moveable and fixed electrode tracks may be as small as 5 µm or less. Preferably the other of the first and second lateral spacing is 4 µm or less. For example, the first lateral spacing may be 10 µm and the second lateral spacing may be 4 µm (or vice versa). It will be appreciated that the interdigitated conductive electrode tracks in such examples are therefore spaced more finely than typical electrode fingers formed from silicon in a conventional MEMS sensor, which usually have a large gap of 16 µm and a small gap of 6 µm. The fineness of the interdigitation may be achieved by lithography when forming the electrode tracks on the facing surfaces. For example, each of the conductive electrode tracks may have a width of 5 µm or less, preferably 4 µm or less, and further preferably 3 µm or less. It will be appreciated that such electrode tracks, for example formed of a conductive metal track, may be narrower than typical electrode fingers formed from silicon in a conventional MEMS sensor. The width of the tracks is set by the accuracy of the lithography and metal etching processes.

As is mentioned above, each electrode preferably has a constant pitch i.e. the conductive electrode tracks in each of the first and second sets are equally spaced in the radial direction. This is preferably the same pitch for each of the plurality of electrodes. In each electrode, the radial offset is between the interdigitated moveable and fixed conductive electrode tracks, i.e. between the first and second sets. The pitch of the conductive electrode tracks in the first set, that is the lateral spacing between moveable electrode tracks, is preferably 30 µm or less, further preferably 25 µm or less, and most preferably 20 µm or less. The pitch of the conductive electrode tracks in the second set, that is the lateral spacing between fixed electrode tracks, is preferably 30 µm or less, further preferably 25 µm or less, and most preferably 20 µm or less.

It will be appreciated that, when voltage signals are applied to the electrodes, the axial spacing between the first and second sets of conductive electrode tracks can result in electrostatic forces acting both in-plane and out-of-plane for the silica ring structure. However a benefit of forming the planar ring structure from a silica-based material is that it may have a high stiffness resisting out-of-plane deformation due to its thickness. In practice, only the in-plane component of an electric field may cause vibration of the planar ring structure at the 2θ resonance frequency of the ring as there is no mode at this frequency out of plane. The silica ring structure preferably has a radial width that is comparable to conventional silicon ring structures used in gyroscopes, for example about 100 µm, in order to set the required 2θ resonance frequency. However the electrodes according to the present disclosure can provide an improvement in terms of the electric field achieved for the same voltage, because the conductive electrode tracks formed on the surface of the silica-based ring (rather than electrode fingers formed in a silicon substrate) can have a reduced pitch, as outlined above. The interdigitation multiplies the electrostatic force linearly with the number of track pairs. For a silica-based ring that is 100 μm wide and interdigitated electrode tracks having a pitch of 20 μm, each electrode can comprise five track pairs.

The planar ring structure may be mounted to vibrate in-plane in any suitable way. Conveniently, the silica substrate layer comprises a plurality of compliant support legs that mount the planar ring structure to a fixed central support. For example, 8 or 16 support legs may be equi-spaced radially around the fixed central support. The planar ring structure may take the form of a single continuous ring. As in a conventional silicon gyroscope, the width and length of the support legs sets the resonance frequency in conjunction with the mass of the planar ring structure. This is normally set in the range 10-30 kHz (depending on sensitivity required) similar to existing silicon ring gyros. This can be compared to 5-50 kHz for commercially deployed MEMS gyroscopes which use a mass vibrating out of plane.

It is preferable that the angular velocity sensor further comprises a second insulative support layer arranged to face an opposite surface of the silica substrate layer. For example, the sensor may be manufactured as a three-layer structure with the silica substrate layer sandwiched between first and second insulative support layers. The layers are preferably hermetically sealed together, e.g. to form a vacuum package. This ensures that the oscillating silica-based ring is operating in a vacuum, which is required to achieve a high Q. If the sensor is not a hermetic three layer assembly then alternatively an external package may form a hermetic seal so that the planar ring structure oscillates in a vacuum. It is important that the ring structure oscillates in a vacuum to achieve a high Q.

The plurality of electrodes disclosed herein may comprise fixed conductive electrode tracks formed on a surface of the first and/or second insulative support layer. For example, some or all of the plurality of electrodes may be formed between the silica substrate layer and an upper insulative support layer and some or all of the plurality of electrodes may be formed between the silica substrate layer and a lower insulative support layer. As is described above, it is preferable for an insulative support layer that carries conductive electrode tracks to be axially spaced from the facing surface of the silica substrate layer by a relatively small gap e.g. 20 μm, to ensure sufficient electric field strength between the interdigitated electrode tracks. However, in some examples one of the first and second insulative support layers may not carry any conductive electrode tracks and may therefore be axially spaced by a larger gap. For example, the second insulative support layer that is facing an opposite surface of the planar ring structure may be axially spaced therefrom (in an axial direction normal to the planar ring) by a gap of at least 100 μm, preferably at least 200 μm, and further preferably about 300 μm. This larger axial gap can conveniently accommodate a thin film getter on the facing surface of the second insulative support layer to ensure a high vacuum, as required for a high Q.

In the plurality of conductive electrodes, each electrode may comprise first and second sets of conductive electrode tracks which take the form of metal tracks on the surface of the respective facing surfaces. Suitable metals include tungsten, aluminium and gold. Preferably the metal tracks are formed from tungsten or gold, in contrast to aluminium as typically used to form electrical contacts on a silicon substrate. A high melting point metal such as tungsten or gold may be preferred as this means that the electrode tracks can be formed as a metal pattern before anodic bonding of the silica substrate layer to the insulative support layer(s), as anodic bonding takes place at a temperature ~450° C. Such metals can also be patterned by photolithographic techniques. However, the layers may alternatively be bonded together using a glass frit or fusion bonding. In one set of examples, the sensor comprises a silica substrate layer bonded to one or more glass support layers by a glass frit (which uses a lower melting point glass material to form a seal between the silica layer and each glass support layer). In another set of examples, the sensor comprises a silica substrate layer bonded to one or more silica support layers by fusion bonding. However an anodic bonding technique may be preferred as it gives a robust and accurate joint, regardless of the material forming the insulative support layer(s). The first and/or second insulative support layer may be formed from any suitable insulator material, for example glass or silica. Suitable anodic bonding processes are disclosed in "Glass-to-glass anodic bonding processes and electrostatic force", J. Wei et al., Thin Solid Films, 462-463 (2004), p. 487-491, the contents of which are hereby incorporated by reference. Anodic bonding between glass (e.g. SD2 glass) and silica may require a thin silicon interlayer. However the planar ring structure is still formed of a silica-based material, rather than silicon, according to the present disclosure.

As in a conventional gyroscope, it is preferable that the silica ring structure has electrodes formed on its surface which provide for electrostatically driven and capacitively sensed in-plane vibrations. Typically, in-plane sensing of rotation around an axis (e.g. z-axis) normal to the planar ring structure is achieved by driving the ring structure into a primary cos 2θ mode of vibration at resonance, for example by applying an AC drive voltage at the resonance frequency of the cos 2θ vibration mode in conjunction with a DC bias voltage. The angular velocity can be measured in one or either of two ways: (i) by detecting the amount by which the previously nodal points now move apart and measuring the amplitude of motion on secondary pick-off electrodes, i.e. open loop; or (ii) by establishing an electrostatic restoring force which keeps the primary vibration mode in the original place on the ring structure and nulls the motion on the secondary electrodes, i.e. closed loop with voltages applied to secondary drive electrodes.

The plurality of conductive electrodes may comprise:
  a primary drive electrode arranged to apply a primary drive signal that causes the ring structure to vibrate in-plane in a primary cos 2θ mode at a substantially resonant frequency;
  a primary pick-off electrode arranged to determine and stabilize the frequency of vibrations in the primary cos 2θ mode; and
  a secondary pick-off electrode arranged to detect in-plane vibration of the ring structure in a secondary sin 2θ mode due to Coriolis coupling between the primary and secondary modes resulting from an angular velocity about an axis normal to the planar ring structure;
  the sensor further comprising a feedback control connected to the primary pick-off electrode to stabilize the amplitude of motion of the primary cos 2θ mode. A feedback control such as an amplitude gain control (AGC) is typically required as the scale factor of the sensor depends on the amplitude of motion, and this needs to be controlled. The primary pick-off electrode can stabilise the primary drive via an AGC loop—this should be controlled as the scale factor depends on the amplitude of motion. The primary pick-off electrode drives a feedback control e.g. servo to stabilise the frequency to match the resonant frequency of the planar ring structure, e.g. to ensure that the sensor is operated at the peak of resonance. In an open loop configuration, the secondary pick-off electrode detects the amplitude of secondary motion, which is then proportional to angular rate. In a closed loop configuration, the sensor may further comprise a servo-controlled secondary drive electrode to null out the secondary motion as determined by the secondary pick-off electrode. Therefore, the plurality of conductive electrodes may further comprise: a secondary drive electrode arranged to apply drive voltages that null the secondary sin 2θ mode, e.g. by using closed loop servo electronics to null signals from the secondary pick-off electrode.

Preferably each of the primary and secondary drive electrodes has the same radial offset between the interdigitated fixed and moveable conductive electrode tracks. This means that opposing electrodes (e.g. primary and secondary drive) will have the same sense of offset so a common voltage will result in the same outward/inward force being applied to the planar ring structure. In addition (or alternatively), preferably each of the primary and secondary pick-off electrodes has the same radial offset between the interdigitated fixed and moveable conductive electrode tracks. This means that the signals from the two pick-off electrodes can be commoned for input to a pre-amplifier. Each of the primary and secondary drive electrodes, and the primary and secondary pick-off electrodes, may comprise a pair of electrodes spaced diametrically apart on the planar ring structure, i.e. eight drive and pick-off electrodes in total. Furthermore, in examples where the drive and pick-off electrodes are circumferentially spaced around the planar ring structure, each electrode preferably has the same first and second lateral spacings between the fixed and moveable conductive electrode tracks in the radial direction (i.e. from an inner periphery of the ring to an outer periphery of the ring) so that any electrostatic forces act in the same direction for diametrically opposed electrodes. This means that the ring breathes out and in with the same amplitude along any given diameter e.g. when oscillating in the primary cos 2θ mode.

When the planar ring structure is formed of a silica-based material according to the present disclosure, there is achieved a lower TED, which increases Q e.g. up to $10^6$, but this requires there to be very exact frequency matching between the primary and secondary modes of vibration e.g. to within 0.001 Hz or even 0.0001 Hz. It is therefore preferable that the plurality of conductive electrodes offers active electrostatic balancing. Accordingly, in addition or alternatively, the plurality of conductive electrodes may comprise four sets of four electrostatic balancing (ESB) electrodes arranged to provide vibrational frequency adjustment for the planar ring structure, in particular to balance the frequency of primary and secondary modes of in-plane vibration. Such vibrational frequency adjustment may be applied to null the secondary quadrature signal (out of phase with the secondary angular rate signal), which reduces the initial Δf. Even in an open loop configuration, balancing of the primary to secondary resonance frequency is beneficial (e.g. by nulling the secondary quadrature signal) using such ESB electrodes. In a closed loop configuration, the two modes may be balanced by altering the voltages on the ESB electrodes so that the secondary quadrature drive signal is nulled when the secondary pick-off quadrature signal is at a null.

In various examples the planar ring structure comprises inner and outer peripheries extending around a common axis. A majority of the plurality of electrodes is preferably spaced equally around the common axis on the surface of the silica-based ring structure. The plurality of electrodes may comprise primary and secondary drive and pick-off electrodes positioned (e.g. equi-spaced) around the inner periphery of the planar ring structure. For example, two primary drive electrodes, two secondary drive electrodes, two primary pick-off electrodes and two secondary pick-off electrodes, i.e. eight electrodes arranged around the inner periphery of the planar ring structure. In addition, the plurality of electrodes may comprise four sets of four electrostatic balancing electrodes positioned (e.g. equi-spaced) around the outer periphery of the planar ring structure. The plurality of electrodes may consist of 24 electrodes in total.

Preferably the sensor comprises an independent electrical connection to the second set of fixed conductive electrode tracks on the facing surface of the insulative support layer for each electrode, e.g. so that each electrode can be driven/sensed separately. These electrical connections may be arranged to apply a variable (e.g. AC) voltage signal to the fixed electrode tracks (i.e. one half of the interdigitated electrode tracks). Such electrical connections may penetrate the insulative support layer using a downhole via, as is known in the art. In a conventional angular velocity sensor the planar ring structure is usually formed of a conductive material (e.g. highly doped silicon) and the electrodes of the ring structure are electrically interconnected at a common voltage in use. This can be contrasted with a sensor according to examples of the present disclosure, wherein each set of the primary drive electrodes, secondary drive electrodes, primary pick-off electrodes and secondary pick-off electrodes comprises its own separate electrical connection.

Each of the first sets of moveable conductive electrode tracks on the surface of the silica-based planar ring structure may be electrically connected in common, e.g. commoned to a HT voltage. Preferably the sensor comprises a single common electrical connection to the first set of moveable conductive electrode tracks for each electrode. This common electrical connection may be arranged to apply a bias voltage, e.g. a constant DC voltage signal. The single bias voltage preferably applied by the common electrical connection to the moving silica-based ring structure is independent of driving, sensing and electrostatic balancing. The common electrical connection may extend from each the first sets of moveable conductive electrode tracks, for example with metal tracking along the legs of the ring structure, to a fixed central hub. Preferably the common electrical connection then extends from the fixed central hub to an outer surface of the insulative support layer. Accordingly the only externally-accessible electrical connection to the moving silica-based ring may be a fixed HT connection which provides a common biasing to the (e.g. 24) separate interdigitated pairs of electrode tracks forming the electrodes.

It will be appreciated that, as none of the layers are formed of a conductive or semiconductor material (unlike a conventional silicon gyroscope), and the interdigitated electrode tracks of each electrode are axially spaced by a gap between the facing surfaces, at least one electrical connection is required that extends between the layers e.g. to reach the common electrical connection on the surface of the silica-based substrate layer. Such an electrical connection may comprise a single downhole via extending between the silica-based substrate layer and an outer surface of the relevant (first or second) insulative support layer. When the layers are hermetically sealed together, the skilled person will be able to devise a way of forming an electrical connection, such as metal tracking, that can cross the hermetically sealed boundary between the layers. For example, the electrical connection may comprise direct wire bonding or any other known method of forming an interconnect in semiconductor or MEMS device fabrication. Hermetic sealing and the formation of electrical interconnects is discussed, for example, in MEMS Materials and Processes Handbook, R. Ghodssi and P. Lin, 18 Mar. 2011.

Although the description above relates to driving the planar ring structure into a primary cos 2θ mode of vibration at resonance, it will be appreciated that the present disclosure can be extended to any cos nθ mode, where n=2, 3, 4, etc.

According to the present disclosure the substrate layer is formed of a silica-based material, in other words a material comprising silicon dioxide as its major component. Naturally-occurring silica or silicon dioxide is unlikely to have a high enough purity for MEMS applications. The silica-based material is preferably fused silica. This is a high purity grade of synthetic silicon dioxide, i.e. around 99.4-99.9% $SiO_2$, typically produced by carbon arc, plasma arc, gas-fired continual extrusion or carbon electrode fusion. Preferably the silica-based material is isotropic, for example amorphous or non-crystalline. Silicon, on the other hand, is anisotropic. Suitable silica-based materials may include titania silicate glass, for example Ultra Low Expansion glass (ULE), which has a very low coefficient of thermal expansion and contains as components silica and less than 10% titanium dioxide. Suitable silica-based materials may include ZERODUR®, an extremely low expansion glass ceramic (lithium aluminium silicon oxide) characterised by evenly distributed nano-crystals within a residual glass phase. Other silica-based materials, or in fact any isotropic insulator material, may be chosen which have a thermal expansion rate less than 3 ppm/° C. and may therefore achieve lower thermoelastic damping (TED) than silicon and hence a higher Q.

The present disclosure extends to an angular velocity sensor comprising a planar ring structure formed of any suitable isotropic insulator material in place of a silica-based material.

An angular velocity sensor according to the present disclosure is preferably a MEMS device.

BRIEF DESCRIPTION OF DRAWINGS

One or more non-limiting examples will now be described with reference to the accompanying drawings in which.

DETAILED DESCRIPTION OF DRAWINGS

Figure 1:
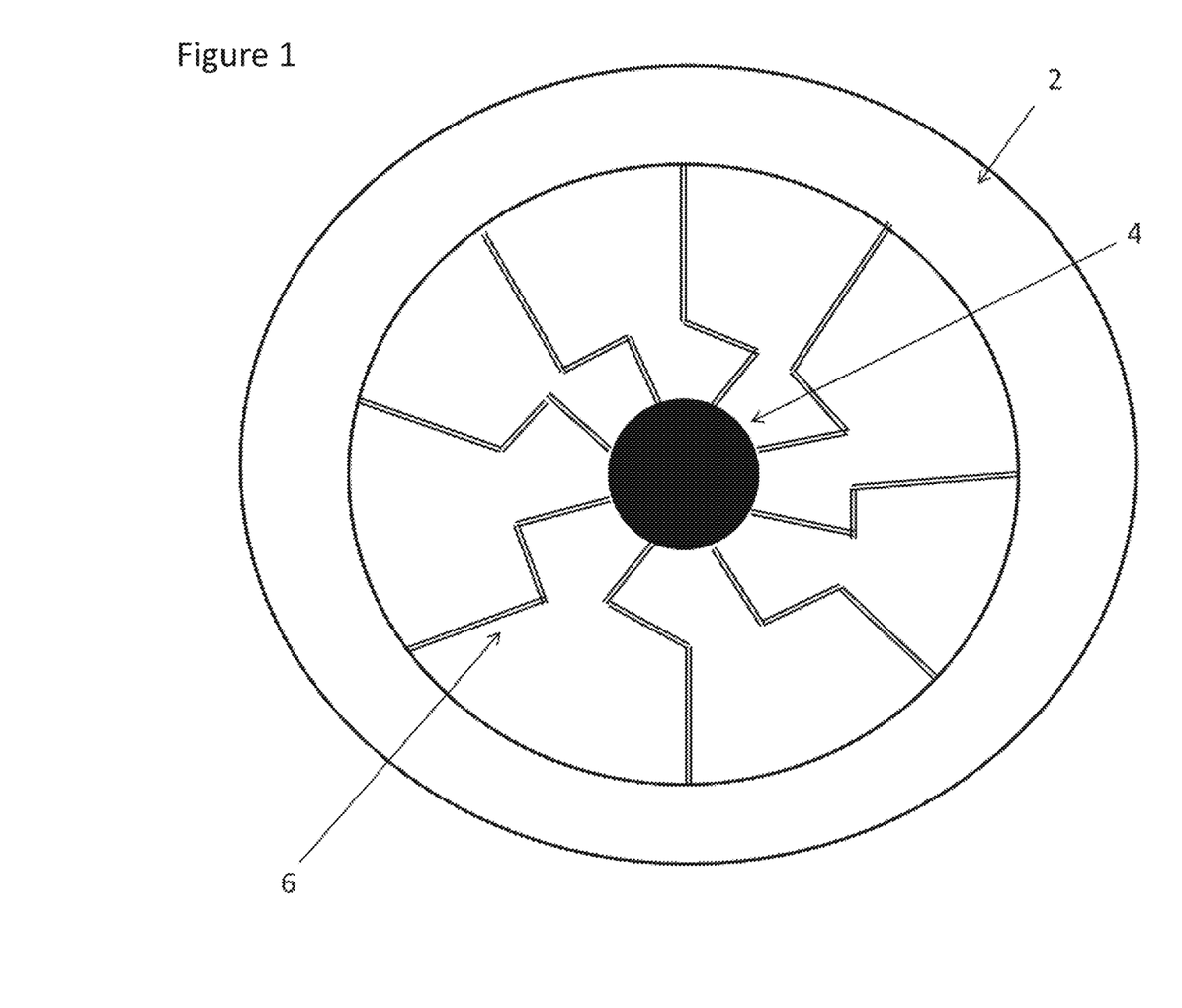
FIG. 1 is a schematic diagram of a planar ring structure formed from silica or silica-based material.

FIG. 1 shows an annular ring structure 2 formed from silica or silica-based material and mounted to a fixed central hub 4 by compliant legs 6. The legs 6 are equi-spaced, either 8 or 16, and formed from the same silica as the annular ring 2. This can be done by a process of deep reactive ion etching (DRIE) using inductively coupled plasma (ICP) etching, which is normally used for silicon but can be used with a different chemistry for silica. A machine to do this is available from SPTS Technologies (the Omega APS). The ring structure 2 is mounted so as to be able to vibrate in-plane.

Figure 2:
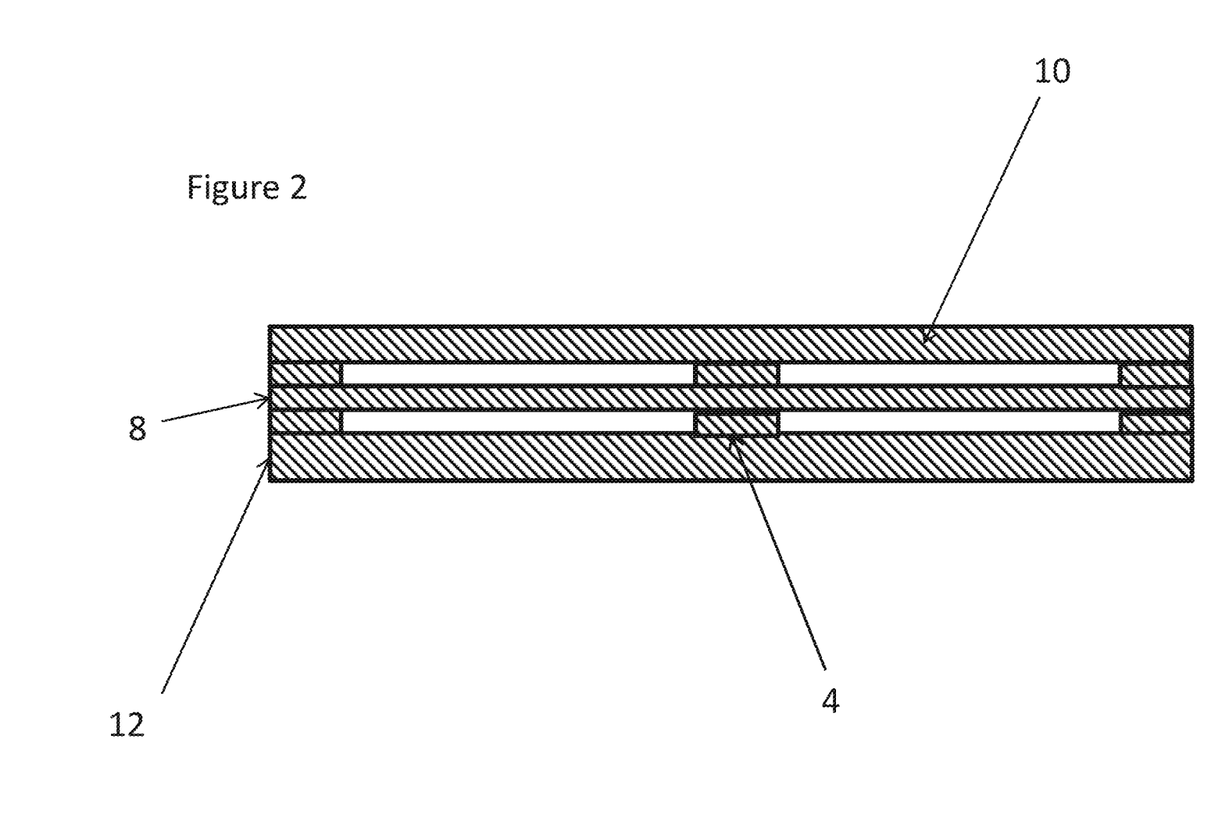
FIG. 2 is a schematic side view of a MEMS structure for an angular velocity sensor including such a planar ring structure.
Figure 3A:
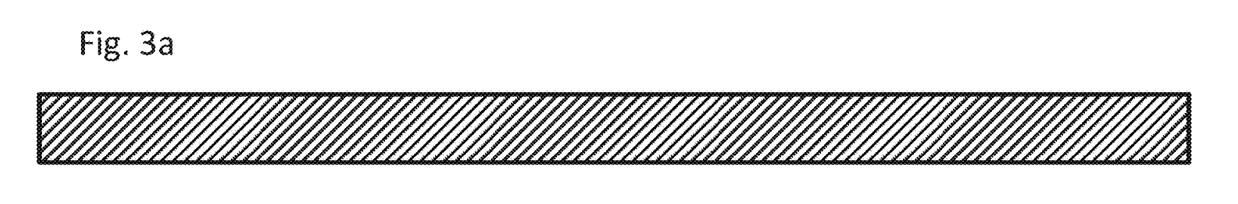
FIG. 3 schematically illustrates a processing scheme for forming electrodes on the facing surfaces of a silica substrate layer and a glass support layer.
Figure 3B:
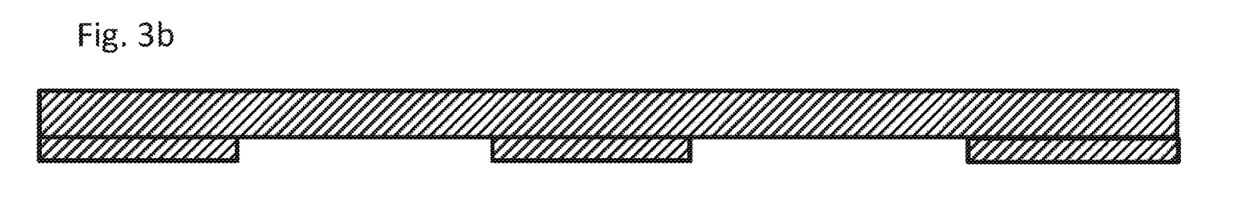
Figure 3C:
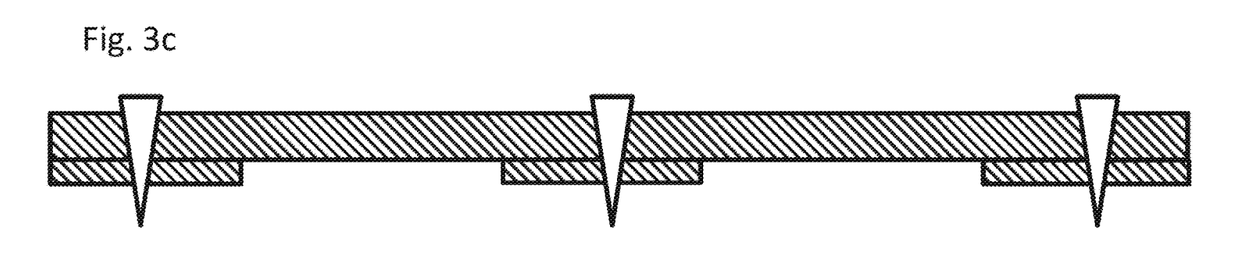
Figure 3D:
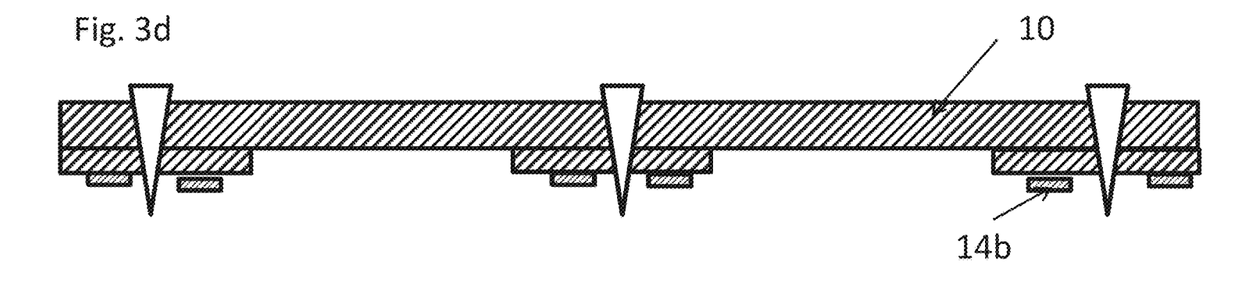
Figures 3E, 3F:
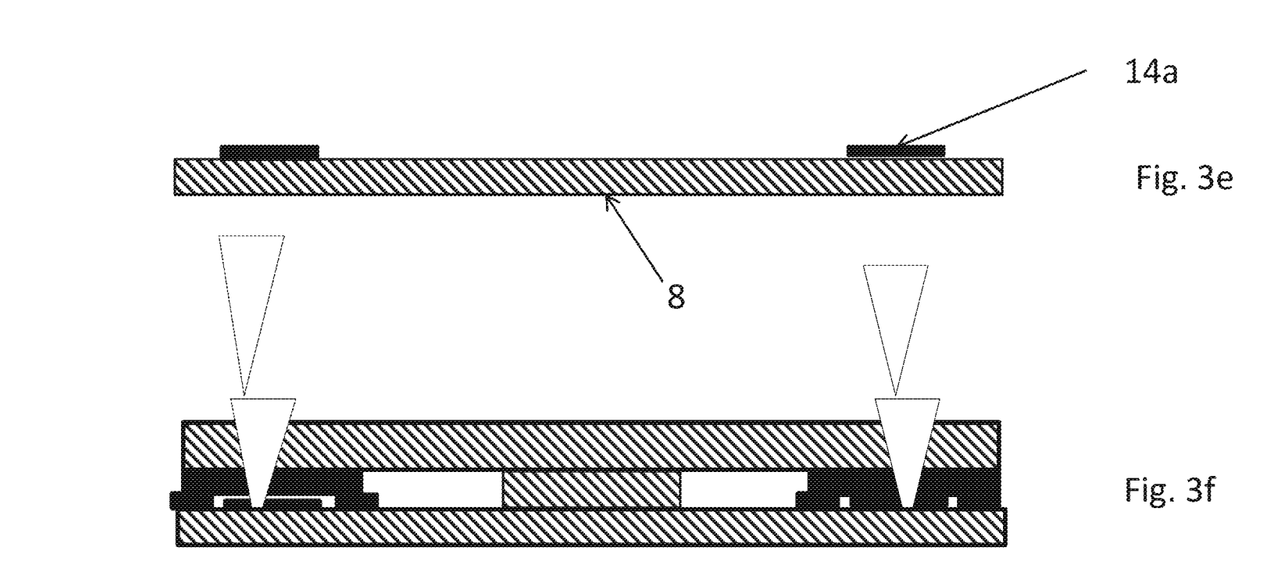
Figure 3G:
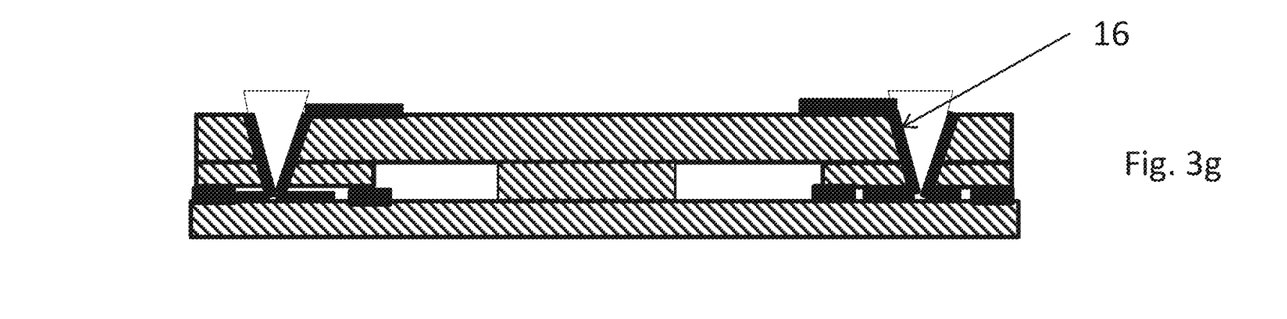

The planar ring structure 2 seen in FIG. 1 is formed from a silica substrate layer 8 in a MEMS stack as seen in FIG. 2. The silica ring layer 8 is bonded to an upper glass support layer 10, and optionally sandwiched between two glass support layers with a lower glass layer 12 as well. There is small axial gap of ~20 microns between the silica substrate layer 8 and the upper glass support layer 10. This gives strong electric fields for drive, pick-off and electrostatic balancing (ESB) electrodes. There is a larger axial gap of ~300 microns between the silica substrate layer 8 and the lower glass support layer 12, which can accommodate a thin film getter on the lower surface of the cavity therebetween and thereby ensure a good vacuum, as required for a high Q. The three layer stack is hermetically sealed to ensure that the ring structure 2 is moving in an enclosed vacuum. The fixed central hub 4 provides mechanical support for the ring structure in the silica substrate layer 8 and also a means of electrical connection to the electrode tracks on the surface of the silica substrate layer 8, as explained further below.

FIG. 3 outlines some of the processing steps that may be involved in forming conductive electrodes on the facing surfaces of the silica ring layer 8 and upper glass support layer 10. FIG. 3a shows the upper glass support layer 10. FIG. 3b shows etching to precavitate the upper glass support layer 10 to a depth of ~20 microns. FIG. 3c shows powder blasting to cut through the upper glass support layer 10 and form holes for downhole vias. Alternatively these holes can be produced by a wet etch process. FIG. 3d shows metallization (e.g. tungsten or gold) on a lower surface of the upper glass support layer 10 to form fixed electrode tracks 14b having a depth ~2 microns. FIG. 3e shows the silica substrate layer 8 with metal electrode tracks 14a formed on its upper surface. In one example, electroplating can be used to form a metal coating with subsequent photolithography to define the pattern of electrode tracks 14a. In this case the electroplating is conformal so that contact can be made from the top surface to the electrode tracks on the silica layer 8, even though there is a gap between the upper glass layer 10 and the silica layer 8. FIG. 3f shows the silica ring layer 8 bonded to the upper glass support layer 10. FIG. 3g shows metal deposited to form a surface layer on top of the upper glass support layer 10 and a downhole via 16 to connect to the fixed metal electrode tracks 14b on the lower surface of the glass support layer 10. The metal electrode tracks 14a, 14b may be formed by electroplating, as mentioned above, or by sputter deposition or any other means of thin film deposition (e.g. electron beam-assisted deposition, RF deposition or thermal evaporation). For example, indium-tin-oxide (ITO) thin film deposition may be suitable. The downhole via 16 may have an electrical connection created by direct wire bonding or any other known method of forming an interconnect in semiconductor or MEMS device fabrication.

The three layer stack can be hermetically sealed in any suitable way. Glass frit bonding uses a low melting point glass to form a seal between the silica and glass layers. An alternative is to use a three layer stack of silica with fusion bonding. Another alternative and potentially preferred method is anodic bonding as it gives a robust and accurate joint. A vacuum is required in the ring environment to develop a high quality factor (Q). This is achieved using a thin film getter which is attached to the lower glass layer 12 seen in FIG. 2. SD2 glass has an expansion rate of about 3 ppm compared to 0.5 ppm for the silica layer. This expansion rate difference will cause stresses, but the bonding top and bottom will be symmetrical so that there will be no overall deformation of the structure in the fully formed structure. Use of a silica three layer stack would avoid these stresses.

Figure 4:
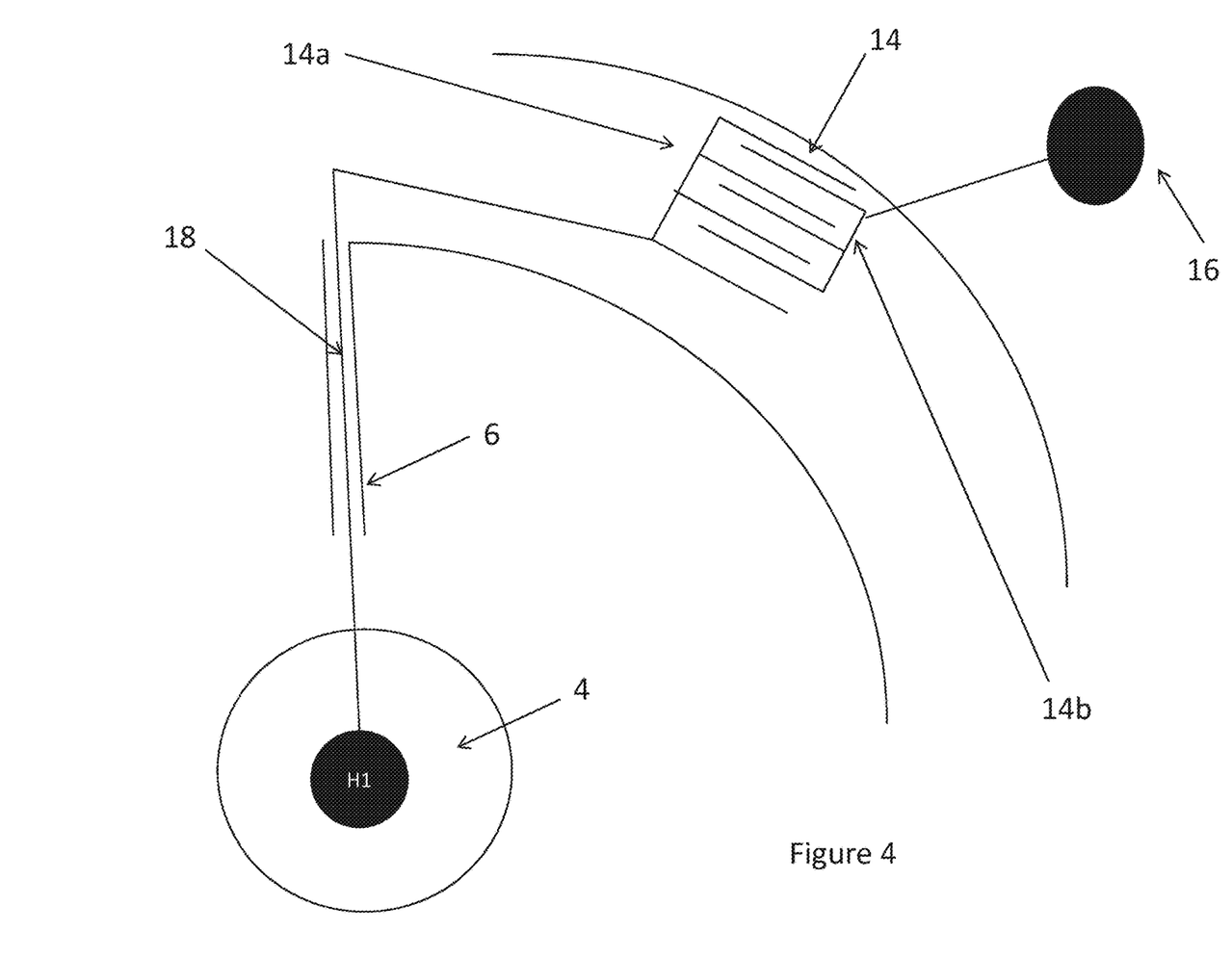
FIG. 4 is a schematic diagram of an electrode comprising offset interdigitated electrode tracks formed on two facing surfaces.

FIG. 4 shows an electrode 14 comprising a plurality of offset electrode tracks 14a, 14b, with a fixed group of electrode tracks 14b on the lower surface of the upper glass layer 10 and a moving group of electrode tracks 14a on the facing surface of the annular ring 2 formed in the silica substrate layer 8. Although only three pairs of electrode tracks 14a, 14b are seen in this schematic diagram, in an exemplary device the silica ring 2 may be 100 microns wide and the pitch of the electrode pairs may be 20 microns, so that there are five interdigitated pairs of electrode tracks 14a, 14b having an offset lateral spacing in the radial direction of the silica ring 2. The set of fixed electrode tracks 14b is electrically connected by a downhole via 16 formed through the fixed upper glass layer. It is also shown schematically how the set of moveable electrode tracks 14a is electrically connected to a common HT electrical connection H1 located on the central hub 4 of the annular ring 2 by tracking 18 along one of the support legs 6. A plurality of such electrodes 14 are arranged around the silica ring 2, circumferentially spaced so as to ensure that each set of fixed electrode tracks 14b (on the lower side of the upper glass layer) is independent of the others, while the HT side of the interdigitated electrode tracks 14a is commoned via the electrical connection H1. Thus 24 tracking connections 18 (to the HT end of the 24 separate electrodes) are split between the 8 or 16 legs 6 to connect to the common HT electrical connection H1. Each set of fixed electrode tracks 14b goes via an independent downhole via 16 in the upper glass layer, so that all 24 of the electrodes 14 are independent of one another e.g. for driving/sensing purposes.

Figure 5:
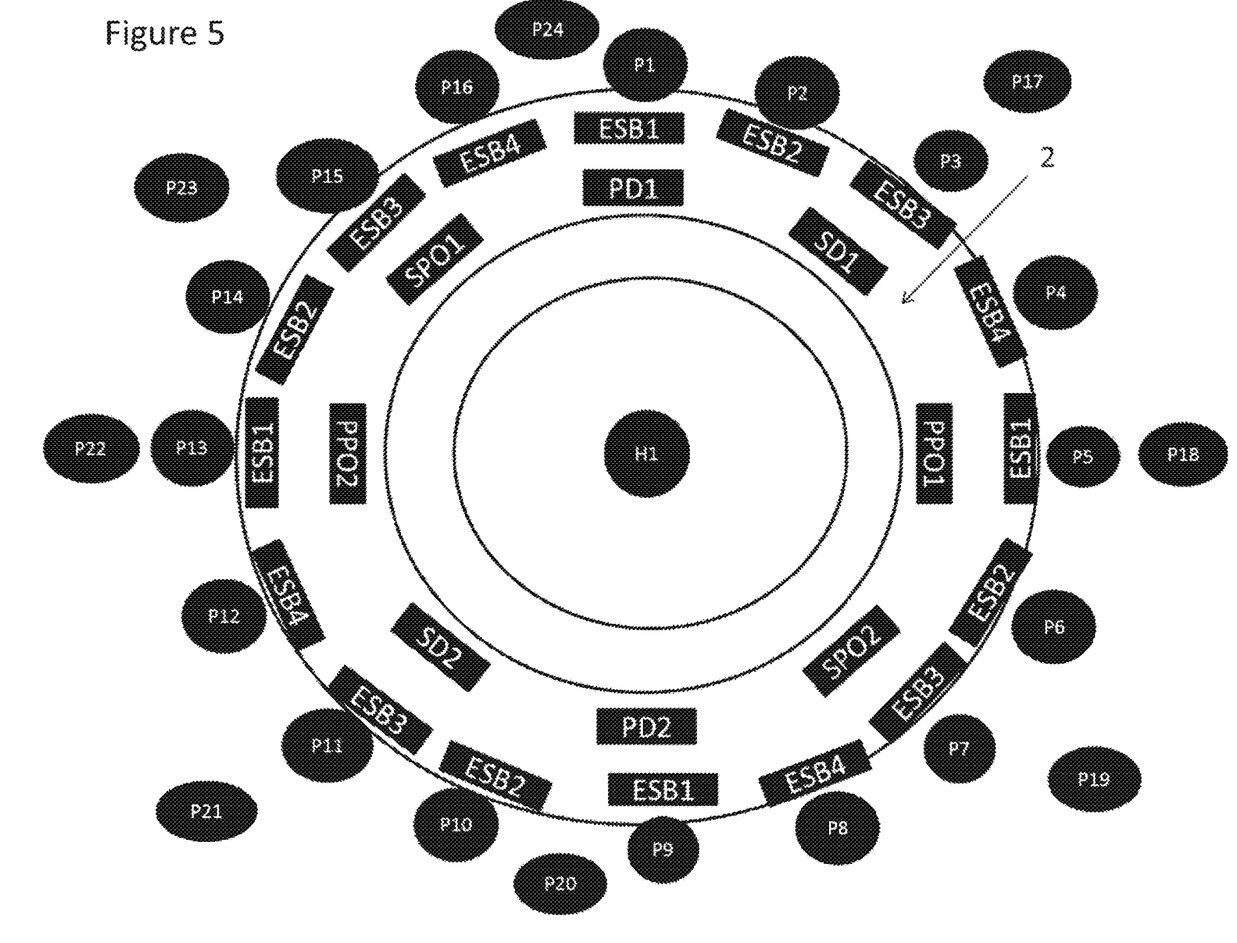
FIG. 5 shows an arrangement of 24 electrodes on the surface of the upper glass support layer with a single HT electrode attached to the hub of a silica ring structure.
Figure 6:
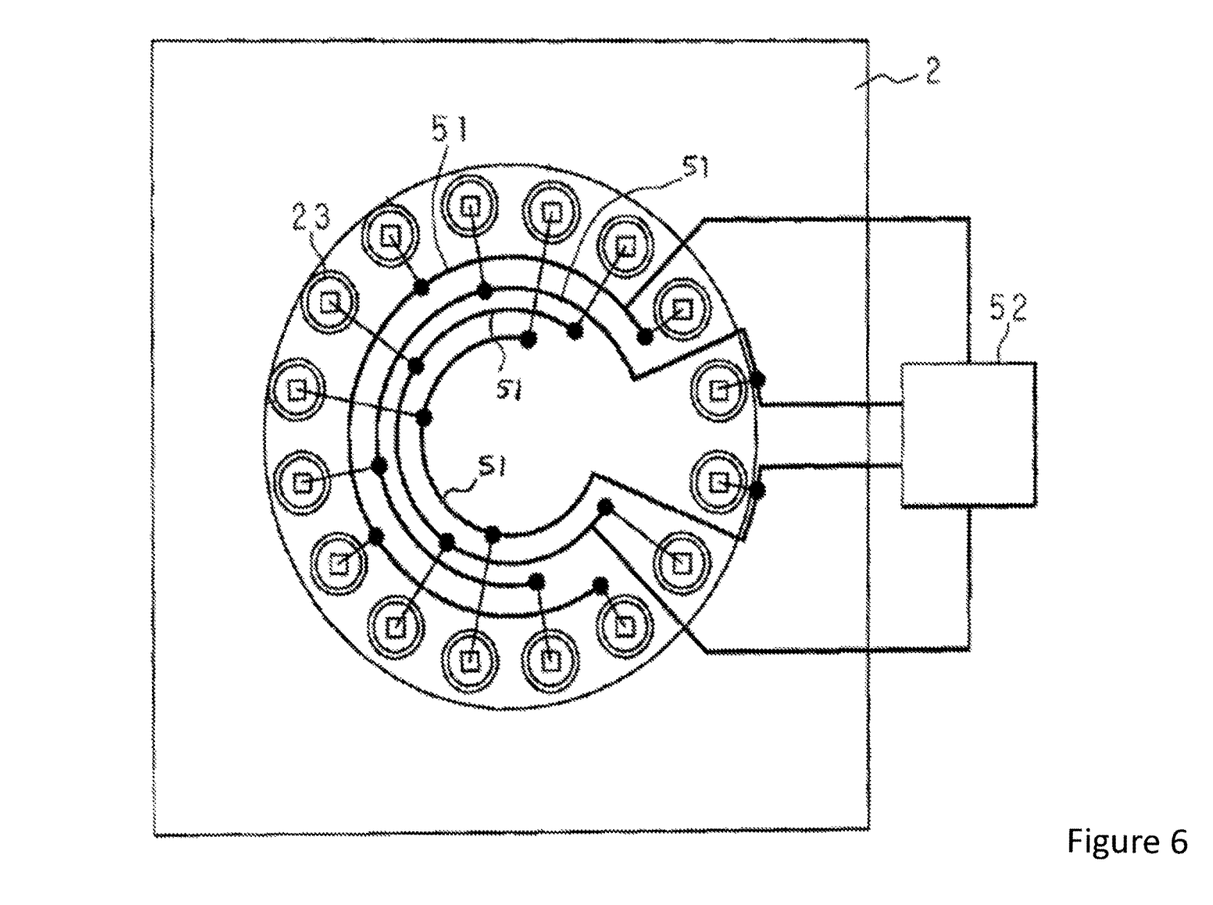
FIG. 6 is a schematic diagram of the interconnections formed on the glass support layer for the 16 electrodes used for electrostatic balancing.

FIG. 5 shows the configuration of the electrodes (rectangular blocks) around a typical silica ring 2. There are 16 ESB (electrostatic balancing electrodes), in four groups of four, arranged around an outer periphery of the ring 2. Thus all four ESB1 electrodes are common, likewise for ESB2, ESB3 and ESB4. Thus an ESB electrode at an angle theta is connected to an electrode at an angle 90°+theta in four groups of four, as shown in FIG. 6. There are eight electrodes for drive and pick-off arranged around an inner periphery of the ring 2: primary drive (PD1, PD2), secondary drive (SD1, SD2), primary pick-off (PPO1, PPO2) and secondary pick-off (SPO1, SPO2). The two primary drive electrodes PD1 and PD2 are connected together, likewise the two secondary drive electrodes SD1 and SD2. The two primary pick-off electrodes PPO1 and PPO2 and the two secondary pick-off electrodes SPO1 and SPO2 are also connected together externally to the MEMS by suitable wire bonding. Downhole vias, represented by circles in FIG. 5, provide electrical connections to each of the 24 electrodes through the fixed glass layer. Downhole vias P1-P16 connect to the 16 ESB electrodes. Downhole vias P17-P24 connect to the eight drive and pick off electrodes. The four groups of four ESB electrodes are then connected together as shown in FIG. 6.

All 24 electrodes comprise fixed electrode tracks on the underside of the upper glass layer, and moveable electrode tracks on the facing surface of the silica ring with a common electrical connection H1 for all 24 of the electrodes. Each of the 24 electrodes will go via tracking to a separate downhole via on the fixed upper glass layer connected to the fixed electrode tracks. At the central hub 4 there is a downhole via for the common connection H1 e.g. to connect to a wire bond pad on the silica ring which connects all the moveable electrode tracks on of one side of the 24 electrodes.

Each of the electrodes comprises two offset interdigitated sets of tracks 14a, 14b (as seen schematically in FIG. 4) which can be used to provide radial electrostatic force, and with applied DC voltages provide an induced voltage for pick offs. The electrode tracks 14a, 14b are axially offset by a gap of ~20 microns (set by the precavitation of the upper glass layer) and radially offset. In an example of capacitive sensing, an AC drive voltage is applied at the resonance frequency of the cos 2θ in-plane vibration mode of the silica ring 2 to the primary and secondary drive electrodes. As the quality factor (Q) is very high there is very good isolation with respect to the other vibration modes (as the drive level can be very low), such as the vertical bounce mode which typically has a frequency of 5 kHz compared to the nominal 14 kHz of the cos 2θ mode. The forcing can be used for both the drive electrodes and the electrostatic balancing (ESB) electrodes.

All the ring electrodes 14 are common to an HT bias voltage so there is then only a single voltage on the moving ring 2 which is connected through to the central hub 4 with a common electrical connection (H1). All variable voltages (ESB, drive and pick off) can then be connected to the fixed electrode tracks on the upper glass layer. The HT bias across the drive and pick off electrodes (as the pick-up is normally around ~1.6 V mean DC) implies that there is a large increase in force for the drive and more gain for the pick-up. In a capacitive gyroscope, by way of comparison, the ring 2 is DC biased at HT and all capacitive electrodes are with respect to this HT voltage (drive, pick-off and ESB). Typical HT voltages are in the range 20-60 V.

In an alternative (unillustrated) configuration, there could be 24 electrode connections going to the central hub 4 via the 8 or 16 support legs 6 when mounted on the moving silica ring 2, with the common HT connected to the fixed glass surface on the lower side of the upper glass layer 10 and a downhole via connected on the periphery of the ring 2. This however implies a lot of tracking along the legs 6, which is in principle possible but less desirable. Also there would need to be 24 independent down hole vias on the central hub 4, which is likely to be difficult due to the size requirements.

FIG. 6 shows how the ESB electrodes 23 may be connected together in four groups of four by virtue of wire bonds 51 across the upper glass layer 10. A voltage source 52 connects together the four sets of ESB electrodes 23 in the sensor 2.

The invention claimed is:
1. An angular velocity sensor comprising:
an insulative support layer;
a substrate layer formed of a silica-based material and comprising a planar ring structure mounted to vibrate in-plane; and
a plurality of conductive electrodes, each electrode comprising:
a first set of moveable conductive electrode tracks formed on a surface of the planar ring structure and a second set of fixed conductive electrode tracks formed on a surface of the insulative support layer that is facing the surface of the planar ring structure and axially spaced therefrom by a gap in an axial direction normal to the planar ring structure;

wherein the first and second sets of conductive electrode tracks are interdigitated with a lateral spacing between each moveable conductive electrode track and an adjacent fixed conductive electrode track in a radial direction of the planar ring structure, and wherein each of the moveable conductive electrode tracks has a radial offset from a median line between adjacent fixed conductive electrode tracks such that each moveable conductive electrode track has a first lateral spacing from an adjacent fixed conductive electrode track in a first radial direction and a second, different lateral spacing from an adjacent fixed conductive electrode track in a second opposite radial direction.

2. The angular velocity sensor of claim 1, wherein the first and second sets of conductive electrode tracks are axially spaced by a gap that is less than 50 µm, preferably less than 40 µm, further preferably less than 30 µm, and most preferably about 20 microns.

3. The angular velocity sensor of claim 1, wherein the pitch of the conductive electrode tracks in the first and second sets is 30 µm or less, preferably 25 µm or less, and most preferably 20 µm or less.

4. The angular velocity sensor of claim 1, wherein the first and second sets of conductive electrode tracks take the form of metal tracks, and preferably the metal tracks are formed from tungsten or gold.

5. The angular velocity sensor of claim 1, wherein each of the conductive electrode tracks has a width of 5 µm or less, preferably 4 µm or less, and further preferably 3 µm or less.

6. The angular velocity sensor of claim 1, comprising an independent electrical connection to the second set of fixed conductive electrode tracks for each electrode.

7. The angular velocity sensor of claim 1, comprising a single common electrical connection to the first set of moveable conductive electrode tracks for each electrode.

8. The angular velocity sensor of claim 1, wherein the plurality of conductive electrodes comprises:

a primary drive electrode arranged to apply a primary drive signal that causes the ring structure to vibrate in-plane in a primary cos 2θ mode at a substantially resonant frequency;

a primary pick-off electrode arranged to determine and stabilize the frequency of vibrations in the primary cos 2θ mode; and a secondary pick-off electrode arranged to detect in-plane vibration of the ring structure in a secondary sin 2θ mode due to Coriolis coupling between the primary and secondary modes resulting from an angular velocity about an axis normal to the planar ring structure;

the sensor further comprising a feedback control connected to the primary pick-off electrode to stabilize the amplitude of motion of the primary cos 2θ mode.

9. The angular velocity sensor of claim 8, wherein the plurality of conductive electrodes further comprises:

a secondary drive electrode arranged to apply drive voltages that null the secondary sin 2θ mode.

10. The angular velocity sensor of claim 8, wherein the primary and secondary drive electrodes and the primary and secondary pick-off electrodes are arranged around an inner periphery of the planar ring structure.

11. The angular velocity sensor of claim 8, further comprising a second insulative support layer arranged to face an opposite surface of the silica substrate layer.

12. The angular velocity sensor of claim 1, wherein the plurality of conductive electrodes comprises four sets of four electrostatic balancing electrodes arranged to balance the frequency of primary and secondary modes of in-plane vibration.

13. The angular velocity sensor of claim 12, wherein the electrostatic balancing electrodes are arranged around an outer periphery of the planar ring structure.

14. The angular velocity sensor of claim 1, wherein the substrate layer and the one or more insulative support layers are hermetically sealed together to provide a vacuum around the planar ring structure.

15. The angular velocity sensor of claim 1, wherein the sensor is a MEMS device.

* * * * *